United States Patent
Ishihara

(10) Patent No.: US 6,185,029 B1
(45) Date of Patent: Feb. 6, 2001

(54) OPTICAL SCANNER AND ELECTROPHOTOGRAPHIC PRINTER EMPLOYING THE SAME

(75) Inventor: Keiichiro Ishihara, Kawasaki (JP)

(73) Assignee: Canon Kabushiki Kaisha, Tokyo (JP)

(*) Notice: Under 35 U.S.C. 154(b), the term of this patent shall be extended for 0 days.

(21) Appl. No.: 09/469,305

(22) Filed: Dec. 22, 1999

(30) Foreign Application Priority Data

Dec. 25, 1998 (JP) ................................................. 10-376754

(51) Int. Cl.$^7$ .................................................. G02B 26/08
(52) U.S. Cl. .................... 359/216; 359/208; 359/217; 359/218; 359/219; 347/261
(58) Field of Search .................... 359/205–208, 359/216–219; 347/243, 259–261

(56) References Cited

U.S. PATENT DOCUMENTS 5,706,119 * 1/1998 Anzai ................................... 359/216

FOREIGN PATENT DOCUMENTS 8-160338  6/1996 (JP).
9-80334   3/1997 (JP).

* cited by examiner

*Primary Examiner*—James Phan
(74) *Attorney, Agent, or Firm*—Fitzpatrick, Cella, Harper & Scinto

(57) ABSTRACT

An optical scanner comprises a light source, a polygon mirror having plural light deflection faces for deflecting a light flux emitted from the light source, a first optical system for introducing the light flux emitted from the light source to the polygon mirror in which the light flux introduced to the polygon mirror has a breadth in a main scanning direction larger than a breadth of one of the light deflection faces in the main scanning direction, and a second optical system for condensing the light flux deflected by the polygon mirror onto a scanned face, wherein the second optical system has at least one reflection member for reflecting and introducing the light flux onto the scanned face, and each of the reflection members has a reflectivity varying from a center toward a periphery in the main scanning direction to uniformize substantially a light quantity distribution in the main scanning direction of the light flux on the scanned face.

18 Claims, 12 Drawing Sheets

OPTICAL SCANNER AND ELECTROPHOTOGRAPHIC PRINTER EMPLOYING THE SAME

BACKGROUND OF THE INVENTION

1. Field of the Invention

The present invention relates to an optical scanner employing an over-field optical system, particularly to an optical scanner which has a reflector between a polygon mirror (a light deflector) and a scanned face to uniformize light quantity distribution of scanning light on the scanned face. The optical scanner of the present invention is useful for electrophotographic printers such as laser beam printers (LBP) and digital copying machines.

2. Related Background Art

The optical scanner for conventional laser beam printers or like printers conducts image recording through the steps of modulating optically a light flux (light beam) emitted from a light source in accordance with image signals; deflecting periodically by a light deflector such as a polygon mirror the optically modulated light; condensing the light into a spot on a photosensitive recording medium face with an image focusing system having prescribed fθ characteristics; and scanning the face of the photosensitive recording medium with the light spot.

FIG. 1 is a schematic perspective view of the main portion of a conventional optical scanner.

In FIG. 1, a light flux emitted from light source 91 is substantially collimated by condenser lens 92. The light quantity of the light flux is limited by aperture stop 93, and the light flux is introduced into cylindrical lens 94 having a prescribed refractivity only in a sub-scanning direction. The substantially collimated light flux introduced into cylindrical lens 94 is emitted in the substantially collimated state in the main scanning plane direction, whereas in the sub-scanning direction, the light flux is focused on deflection face (hereinafter referred to as a "facet" occasionally) 96 of light deflector 95 constituted of a rotating polygon mirror to form substantially a line image.

The light flux deflected by deflection face 96 of optical deflector 95 is introduced through focusing optical system 97 having prescribed fθ characteristics and return mirror 98 onto photosensitive drum face 99, namely a scanned face. The light flux is allowed to scan photosensitive drum face 99 in arrow B direction (main scanning direction) by rotating optical deflector 95 in arrow A direction to record the image information.

In recent years, a higher speed is demanded for the optical scanning system. For example, an over-field optical scanning system (hereinafter referred to as OFS) is re-considered which introduces light flux having a breadth larger than the light deflector face breadth along the main scanning direction.

FIG. 2 is a schematic plan view of the main portion of an optical deflector of this kind of over-field optical scanning system.

In FIG. 2, incident light flux 82 is introduced from a light source (not shown in the drawing) in a range broader than the main scanning direction of facet 96 of polygon mirror as light deflector 95. The angle between the incident light flux and the normal line of the facet face is hereinafter represented by $\theta_i$. A part of incident light flux 82 is deflected by facet 96 as deflected light flux 85 to be introduced onto a scanned face (not shown in the drawing). The breadth of deflected light flux 85 in the main scanning direction varies depending on the angle of deflection by reflection by polygon mirror 95. In other words, the F-number varies with the view angle. Since the intensity of the deflected light flux 85 varies in proportion to the F-number of the deflected light flux 85, the incident light flux 82 having a flat Gaussian distribution of the intensity results in a nonuniform light quantity distribution (light quantity distribution in the line image) on the scanned face (photosensitive drum face).

To solve the above problem, Japanese Patent Application Laid-Open No. 8-160338 discloses an optical scanner in which the nonuniformity of the light quantity distribution caused by the F-number variation of the deflected light flux is corrected by providing a filter having a light transmittance distribution on the optical path between the light source means and the light deflector. However, the device disclosed in the above Laid-Open publication has disadvantages that the light transmittance cannot readily be varied as desired and the tolerance is close in the range since the light flux breadth is small between the light source and the light deflector. Otherwise, with a filter having discontinuous transmittance distribution, the light quantity distribution on the scanned face cannot smoothly be corrected, tending to cause streaks in the output image, disadvantageously.

In other examples, the light quantity distribution on the scanned face is corrected to be substantially uniform in an under-field optical system in which the light flux having a breadth smaller than that of the facet is introduced to a light deflector. For example, Japanese Patent Application Laid-Open No. 9-80334 discloses an optical scanner in which the variation of the light quantity with light emission time length is corrected by varying the reflectivity of a return mirror to uniformize substantially the light quantity distribution on the scanned face.

In an example of practical optical scanners, the drop of the light quantity at the peripheral portion by variation of the transmittance of the focusing optical system is corrected by varying the reflectivities of two return mirrors to uniformize substantially the light quantity distribution on the scanned face.

In the above examples, however, no consideration is taken on the drop of the light quantity caused by the variation of F-number of the deflected light flux and the gradient in Gaussian distribution of the light intensity which are inherent to the OFS system. In the OFS system, the nonuniformity of the light quantity distribution on the scanning face is caused by the drop of the light quantity by variation of F-number of the deflected light flux and the gradient in the Gaussian distribution of the intensity much more than by the time length of light emission and the variation of the light transmittance of the focusing optical system.

The present invention is made in comprehensive consideration of the drop of the light quantity at the peripheral portion by the variation of F-number of the deflected light flux and the gradient in Gaussian distribution of the light intensity in the OFS system.

SUMMARY OF THE INVENTION

The present invention intends to provide an optical scanner for the OFS system which solves the aforementioned problems of the prior art and is capable of uniformizing substantially the light quantity distribution on the scanned face with a simple constitution.

The present invention intends also to provide an electrophotographic printer employing the optical scanner.

According to an aspect of the present invention, there is provided an optical scanner comprising: a light source; a polygon mirror having plural light deflection faces for deflecting a light flux emitted from the light source; a first optical system for introducing the light flux emitted from the light source to the polygon mirror in which the light flux introduced to the polygon mirror has a breadth in a main scanning direction larger than a breadth of one of the light deflection faces in the main scanning direction; and a second optical system for condensing the light flux deflected by the polygon mirror onto a scanned face, wherein the second optical system has one or at least two reflection members for reflecting and introducing the light flux onto the scanned face, and each of the reflection member(s) has a reflectivity varying from a center toward a periphery in the main scanning direction to uniformize substantially a light quantity distribution in the main scanning direction of the light flux on the scanned face.

According to another aspect of the present invention, there is provided an electrophotographic printer comprising: the above optical scanner; a photosensitive member placed on the scanned face to be scanned by the optical scanner; a development device for developing an electrostatic latent image formed by scanning of the photosensitive member with a light flux into a toner image; a transfer device for transferring the developed toner image onto a paper sheet, and a fixing device for fixing the transferred toner image on the paper sheet.

DETAILED DESCRIPTION OF THE PREFERRED EMBODIMENTS

[Embodiment 1]

Figure 1:
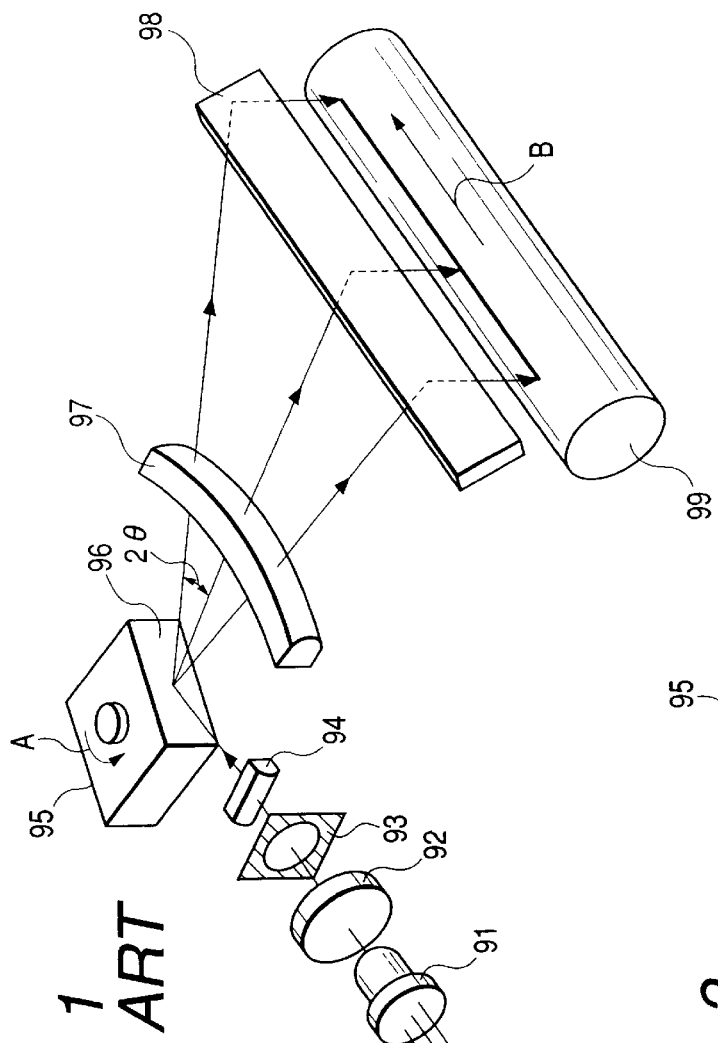
FIG. 1 is a schematic perspective view of a main portion of a conventional optical scanner.
Figure 2:
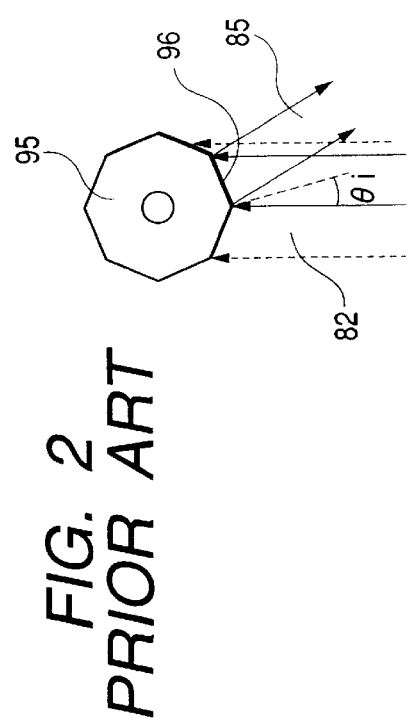
FIG. 2 is a schematic plan view of the main portion of an optical deflector and the related portion thereof in a conventional OFS system.
Figure 3:
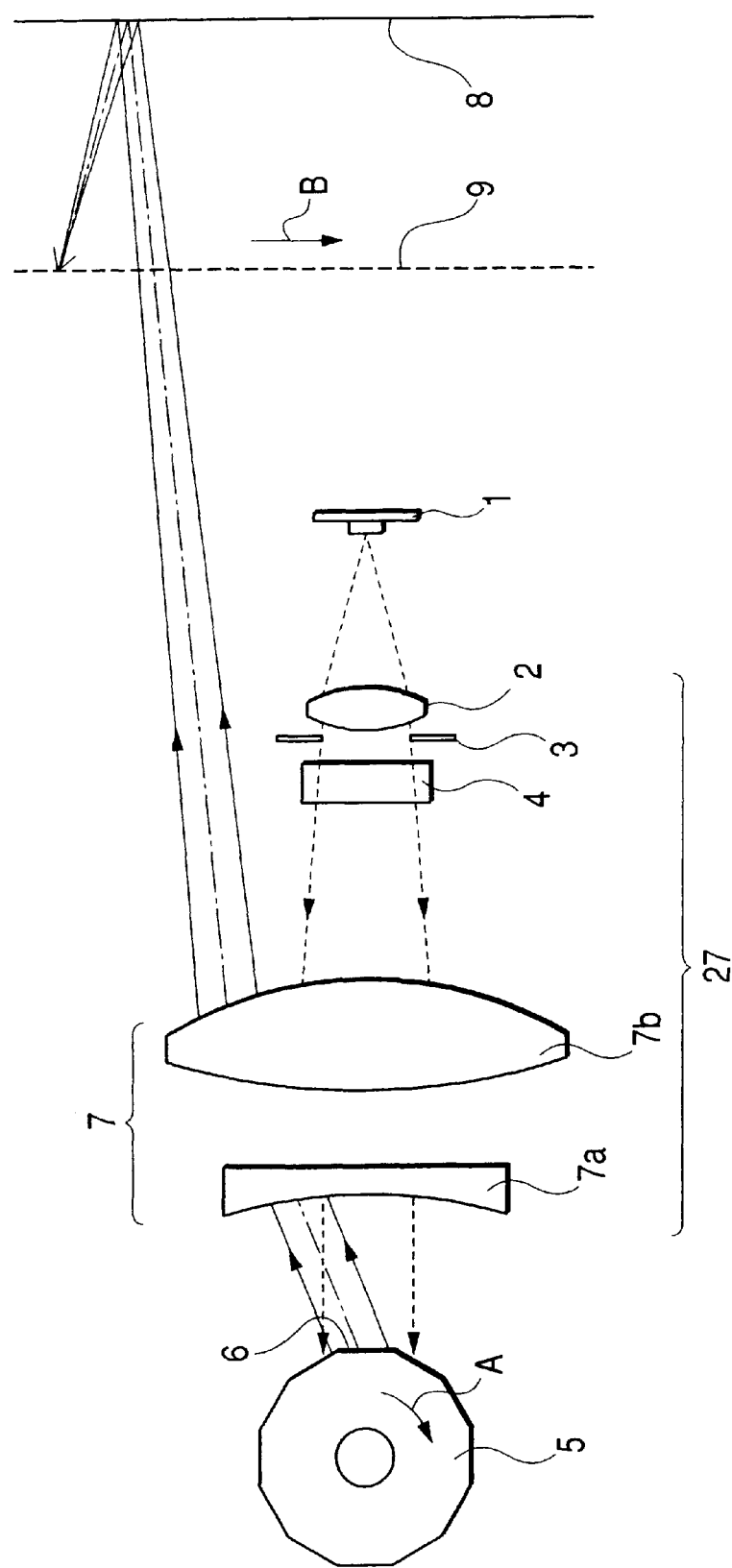
FIG. 3 is a sectional view of the optical scanner of Embodiment 1 of the present invention along the main scanning direction.
Figure 4:
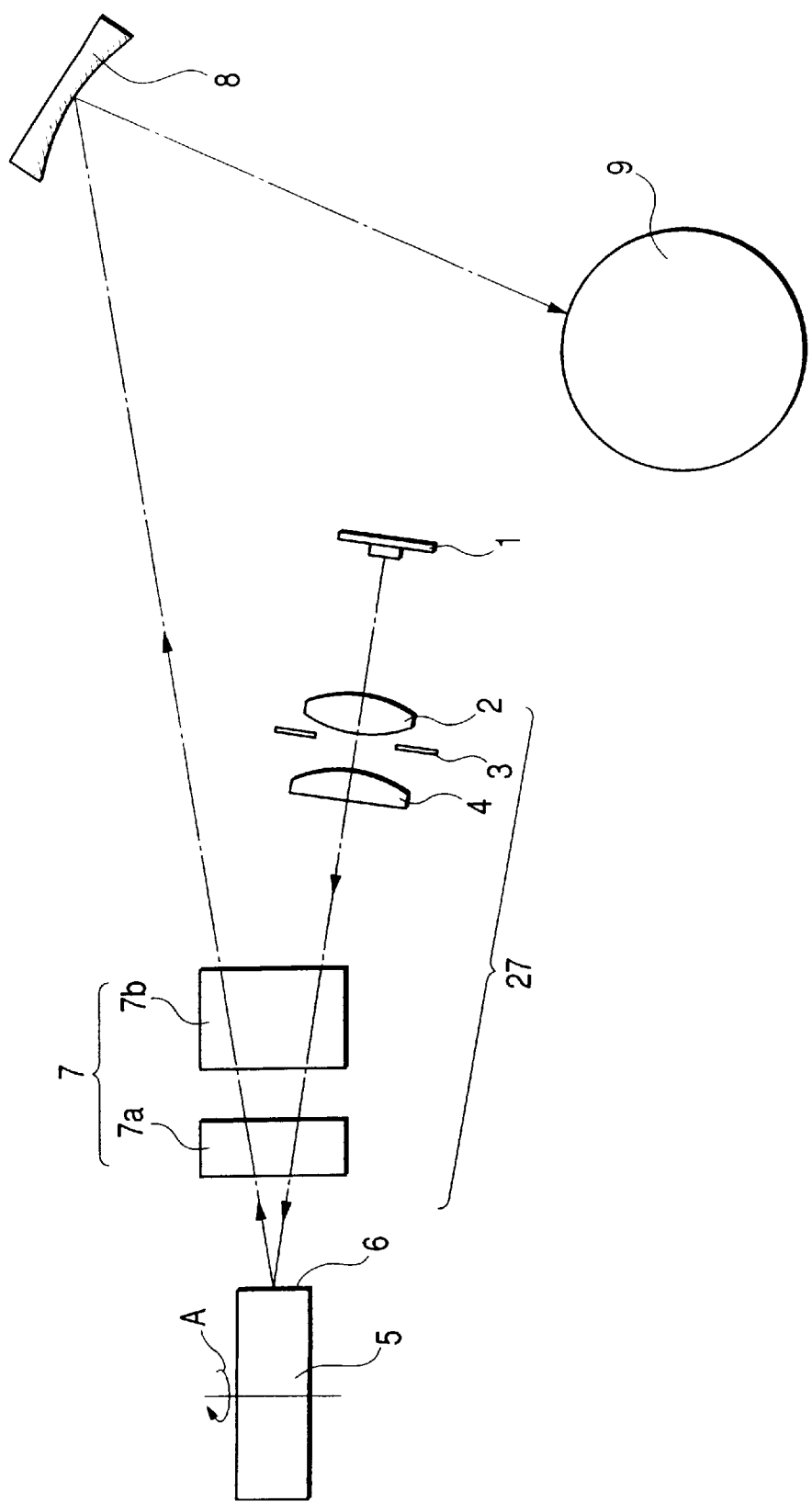
FIG. 4 is a sectional view of the optical scanner of Embodiment 1 of the present invention along the sub-scanning direction.

FIG. 3 is a sectional view of the optical scanner of Embodiment 1 of the present invention along the main scanning direction (main scanning sectional view). FIG. 4 is a sectional view of the optical scanner of Embodiment 1 of the present invention along the sub-scanning direction (sub-scanning sectional view). In this specification, the main scanning direction denotes the direction in which the light flux (light beam) emitted from the light source is allowed to scan by a deflecting means, and the sub-scanning direction denotes the direction perpendicular to the travelling of the light flux (light beam) and to the main scanning direction.

In FIGS. 3 and 4, light source 1 is a semiconductor laser or the like. Condenser lens 2 (collimator lens) converges the diverging light flux to be less divergent. Aperture stop 3 converts the light flux passing through condenser lens 2 into a suitable beam shape. Cylindrical lens 4 has a prescribed power (refractivity) in the sub-scanning direction, and focusing the light flux emitted through aperture stop 3 in the sub-scanning sectional plane (into a line image extending in the main scanning direction). Collimator lens 2, aperture stop 3, and cylindrical lens 4 comprise the elements of first optical system 27.

Light deflector 5, the deflecting means, comprises a polygon mirror or a like member rotating at a constant rotation speed in arrow A direction as shown in FIG. 4 by a driving means like a motor (not shown in the drawing). In this embodiment, the light flux having passed through first optical system 27 is introduced to the polygon mirror 5 at the front face in the main scanning direction (approximately at the center of the deflection angle of polygon mirror 5, namely approximately at the center of the scanning range in the main scanning direction), and is introduced obliquely upward in the sub-scanning direction. The above light flux having passed through first optical system 27 is introduced with a breadth larger than the breadth of the deflection face 6 (facet) of polygon mirror 5 in the main scanning direction. That is to say, they comprise the aforementioned OFS. Second optical system 7 for image formation has the prescribed fθ characteristics, and comprises lens 7a having a negative power, and lens 7b having the power differing between the main scanning direction and the sub-scanning direction. Incidentally, second optical system 7 comprises a part of first optical system 27. Condenser lens 2 and the elements of image-forming optical system 7 comprise a part of light-introducing optical system. In other word, a part of the constitution of the second optical system is common to the first optical system.

Cylindrical mirror 8 as a reflection member (return mirror) has a prescribed power in the sub-scanning direction. The reflectivity is varied from the center toward the periphery.

In other words, in this embodiment, cylindrical mirror 8 is designed such that the reflectivity increases continuously with increase of the incident angle of the light flux introduced to cylindrical mirror 8, and the reflectivity of the polarized light component is designed such that the quantity of reflection of polarized light having a larger polarized light component (e.g., P-component) on the axis is smaller than the sum of reflected light of the polarization component (P-component) outside the axis and the other polarized light component (e.g., S-component).

The numeral 9 indicates a photosensitive drum face (recording medium face) as the scanned face.

In this embodiment, the divergent light flux emitted from light source 1 is made less divergent by condenser lens 2, collimated substantially by image-forming optical system 7, and introduced polygon mirror 5 with an optical flux breadth, in the main scanning direction, larger than the breadth of facet 6. A part of the light flux introduced to polygon mirror 5 is reflected and deflected by facet 6, refracted again by image-forming optical system 7, and introduced through cylindrical mirror 8 onto scanned face 9. By rotation of polygon mirror 5 in the direction shown by arrow A in the drawing, scanned face 9 is optically scanned in the main scanning direction B. On the other hand, in the sub-scanning direction, the less divergent light flux from condenser lens 2 is limited by aperture stop 3. Thereby, a line image is formed by cylindrical lens 4 in the vicinity of facet 6, extending in the main scanning direction. The light flux reflected and deflected by polygon mirror 5 is focused by cylindrical mirror 8 on scanned face 9. Scanned face 9 is optically scanned with the light flux for image recording.

Figure 5:
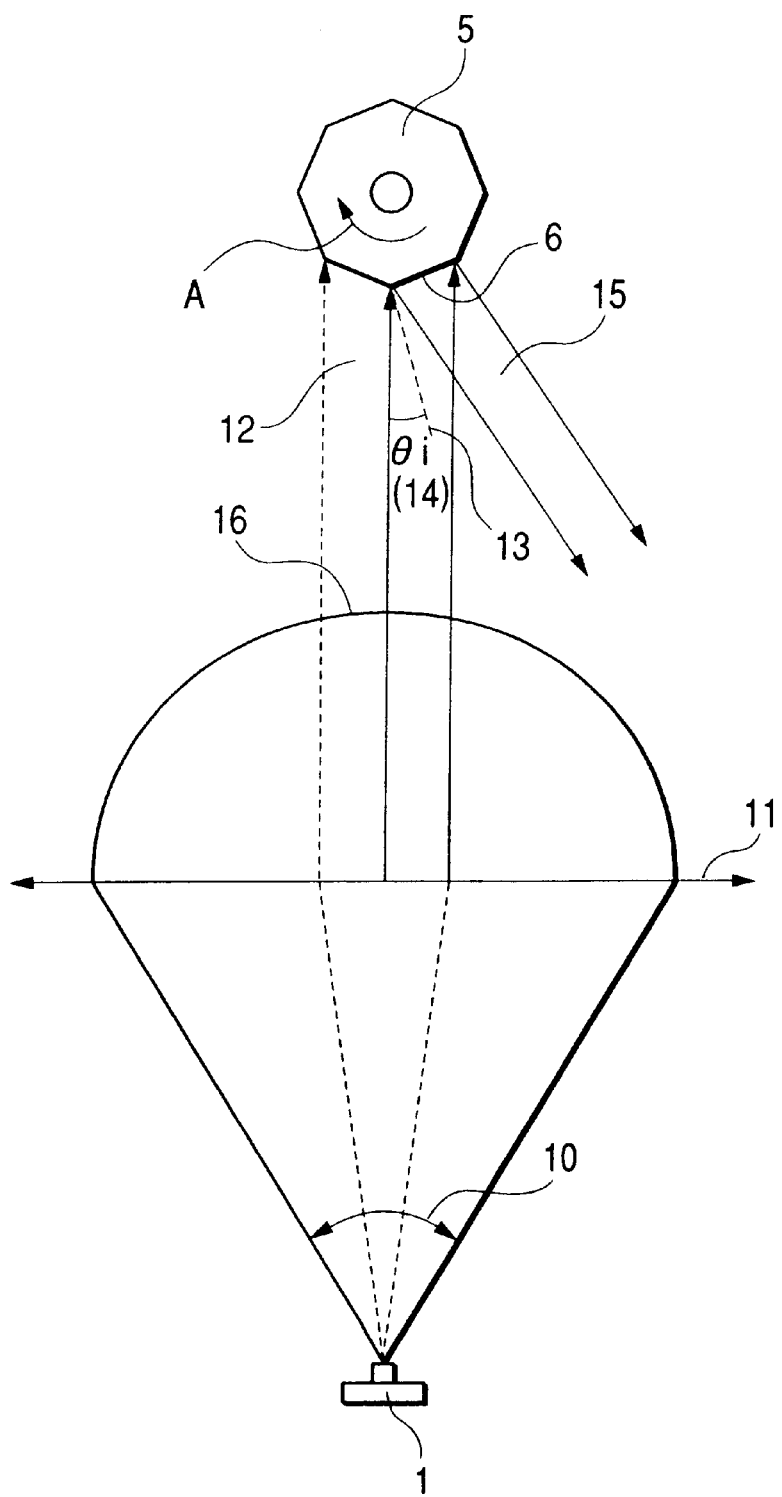
FIG. 5 is a schematic sectional view of the main portion from the semiconductor laser to the polygon mirror along the main scanning direction of Embodiment 1 of the present invention.

FIG. 5 is a schematic sectional view of the main portion from semiconductor laser 1 to polygon mirror 5 along the main scanning direction of this embodiment. In FIG. 5 the same numerals are used as in FIG. 3 for the corresponding elements.

In FIG. 5, the light flux emitted from semiconductor laser 1 is substantially collimated by light-introducing optical system 11 comprising a condenser lens and image-forming optical system into incident light flux 12, and is introduced onto polygon mirror 5 in a range broader than the breadth of facet 6. Deflected light flux 15, which has been formed by reflection and deflection of a part of incident light flux 12 by facet 6 of this polygon mirror 5, scans a face to be scanned not shown in FIG. 5.

In this case, the following relation is established:

$$Fa = 2 \times Rp \times \sin(\pi/M) \quad (1)$$

where Rp is the radius of the circumcircle of polygon mirror 5, M is the number of the facets, and Fa is the breadth of the face of facet 6 in the main scanning direction.

In the OFS system, since a part of incident light flux 12 is reflected and deflected by polygon mirror 5, the breadth of deflected light flux 15 (hereinafter referred to as "deflected light flux breadth") depends on the apparent breadth of facet 6 viewed from direction of incident light flux 12.

Further, the following relation is established:

$$W\theta_i = Fa \times \cos \theta_i \quad (2)$$

where $W\theta_i$ is the deflected light breadth, Fa is the breadth of the face of facet 6 in the main scanning direction, $\theta_i$ (14) is a planar incident angle of the light flux introduced from semiconductor laser 1 onto facet 6 (angle between incident light flux 12 and normal plane 13 of the facet).

From the relations (1) and (2), it is understood that the deflected light flux breadth is smaller to be cos $\theta_i$ of the breadth of incident light flux 12. That is, the F-number of deflected light flux 15 varies depending on the view angle. The intensity of the light intensity of deflected light flux 15, which varies in proportion to the deflected light flux breadth, decreases with the increase of the planar incident angle $\theta_i$, causing nonuniform distribution of the light quantity on the scanned face.

In this embodiment, the radius Rp of the circumcircle of polygon mirror is 40 mm, the number M of the facet is 12, and the breadth Fa of facet 6 in the main scanning direction is 10.35 mm.

In FIG. 3, the light flux directed to the axis (directed to the center of the effective scanning region on the scanned face 9) is introduced to facet 6 at a planar incident angle $\theta_i = 0°$. According to the above Equation (1), the breadth of the deflected light flux W0° is equal to Fa. The light flux directed to the outside of the axis (directed to peripheral portion of the effective scanning region on the scanned face 9) is introduced to facet 6 at a planar incident angle $\theta_i =$ of 13.5°, and the breadth of the deflected light flux W13.5° is equal to Fa×cos 13.5°. Accordingly, the light flux breadth is decreased outside the axis to 97.2% of the light flux breadth on the axis.

Accordingly, the light quantity of deflected light flux 15, which varies in proportion to the deflected light flux breadth, decreases outside the axis similarly to 97.2% of light quantity of the light flux on the axis. In this case, the emission angle 10 ($\alpha$: half-breadth) is 17°, and the effective F-number of the light-introducing optical system 11 is as dark as F=22. Therefore, the Gaussian distribution of the intensity may be regarded as being flat practically without a problem.

In this embodiment, the reflectivity of cylindrical mirror 8 is varied from the center toward the periphery portion as described above such that the light quantity distribution is made uniform by canceling the nonuniformity thereof on the scanned face 9 caused by change of the quantity of deflected light flux 15. Table 1 shows the reflectivity of cylindrical mirror 8 in this embodiment.

In Table 1, the "relative light quantity of deflected light flux" signifies a ratio of the light quantity at a specified view angle to the light quantity on the axis, and is designed to be in the range of ±5%. Thereby, the light quantity distribution of the scanned face is corrected to be substantially uniform not to cause a problem practically, in this embodiment. Here, the word "substantially uniform" signifies that the light quantity variation is in the range of ±5% of the light quantity on the axis over the entire effective scanning range. In other words, the distribution of the light intensity of the light flux scanning the scanned face is within the range of ±5% relative to the light quantity on the axis taken as 100% at any position over the entire effective scanned range.

In this embodiment as described above, the reflectivity of cylindrical mirror 8 placed in the optical path between light deflector 5 and the photosensitive drum is varied from the center portion to the periphery portion to correct the drop of the light quantity at the periphery portion caused by variation of the F-number of the deflected light in the OFS system in which the variation of the intensity is caused by change of the view angle. Thereby, the light intensity distribution can be made uniform over scanned face 9 without lowering the light quantity. In this embodiment, the number of the parts need not be increased, which is advantageous in cost.

[Embodiment 2]

Figure 6:
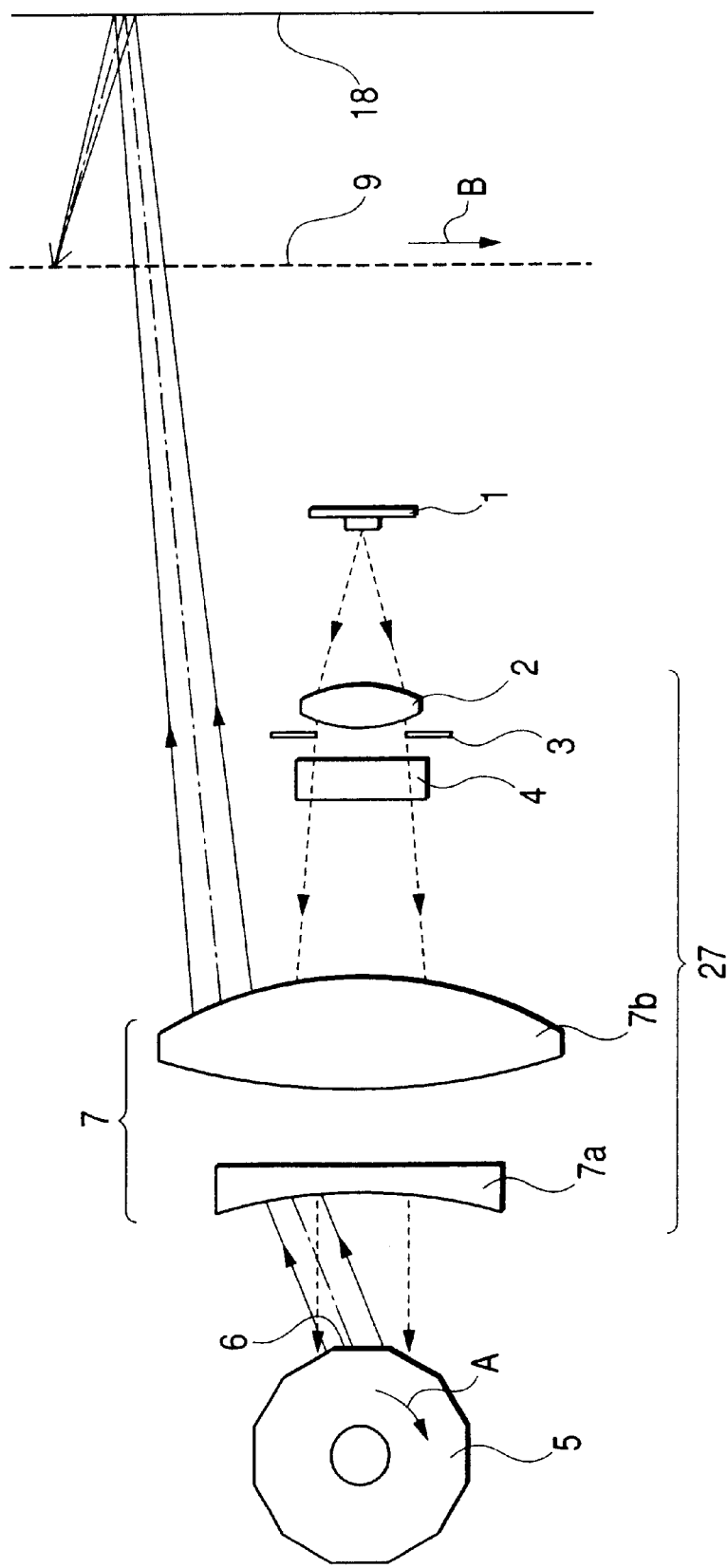
FIG. 6 is a sectional view of the optical scanner of Embodiment 2 of the present invention along the main scanning direction.
Figure 7:
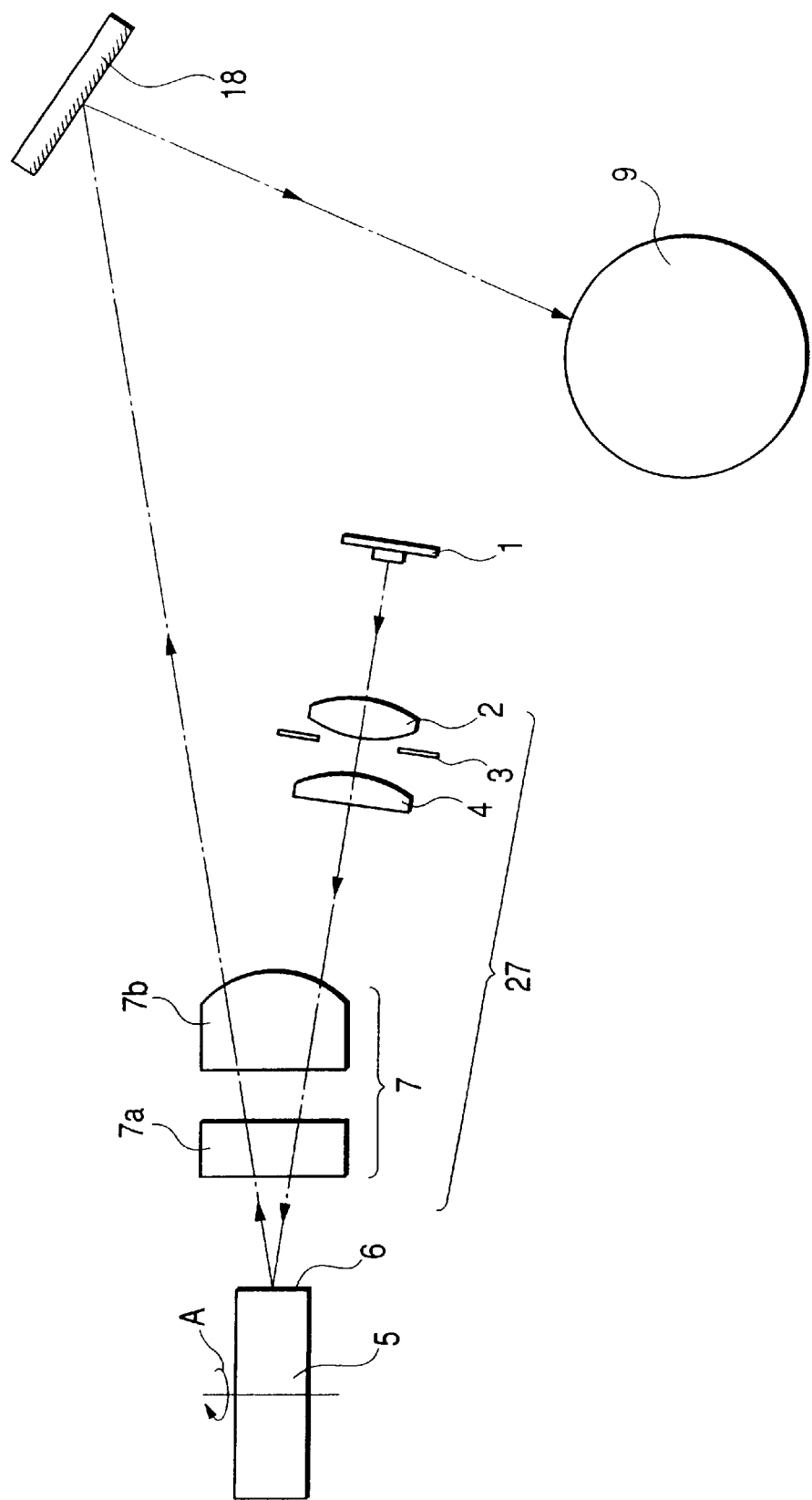
FIG. 7 is a sectional view of the optical scanner of Embodiment 2 of the present invention along the sub-scanning direction.

FIG. 6 is a sectional view of the main portion of the optical scanner of Embodiment 2 of the present invention along the main scanning direction (main scanning sectional view). FIG. 7 is a sectional view of the main portion of the optical scanner of Embodiment 2 of the present invention along the sub-scanning direction (sub-scanning sectional view). In FIGS. 6 and 7, the same numerals as in FIGS. 3 and 4 are used for representing the corresponding elements.

This embodiment is different from Embodiment 1 in that the power of the condenser lens is increased and the distance between the semiconductor laser and the condensed lens is decreased to make brighter the effective F-number to F=6, and that a flat mirror is used as the reflection member. Otherwise, the constitution and the optical performance are nearly the same as in Embodiment 1, whereby the same effects are attained.

Specifically, in FIGS. 6 and 7, flat mirror 18 (return mirror) as the reflection member has the reflectivity varying from the center portion toward the periphery portion.

Thus, in this embodiment, the flat mirror 18 has the reflectivity increasing continuously with increase of the incident angle of the light flux introduced to the flat mirror, and the reflectivity for polarized light of a larger deflection component being lower than for the other deflection component of polarized light. Further, the relation of the reflectivities on the axis and outside the axis is set to satisfy Equations (3) to (6) shown later.

In this embodiment, the power of condenser lens 2 is increased and the distance between semiconductor laser 1 and condensed lens 2 is decreased to make brighter the effective F-number on the side of semiconductor laser 1 of the light-introducing system to F=6, much brighter than that (effective F of 22) of the above Embodiment 1. The "effective F-number" signifies an F-number within the range where the light flux passes actually, the light flux being shown by dotted lines in FIG. 8.

A brighter effective F-number increases the introduced light quantity to decrease the necessary output power of the light source, which is advantageous in cost.

Figure 8:
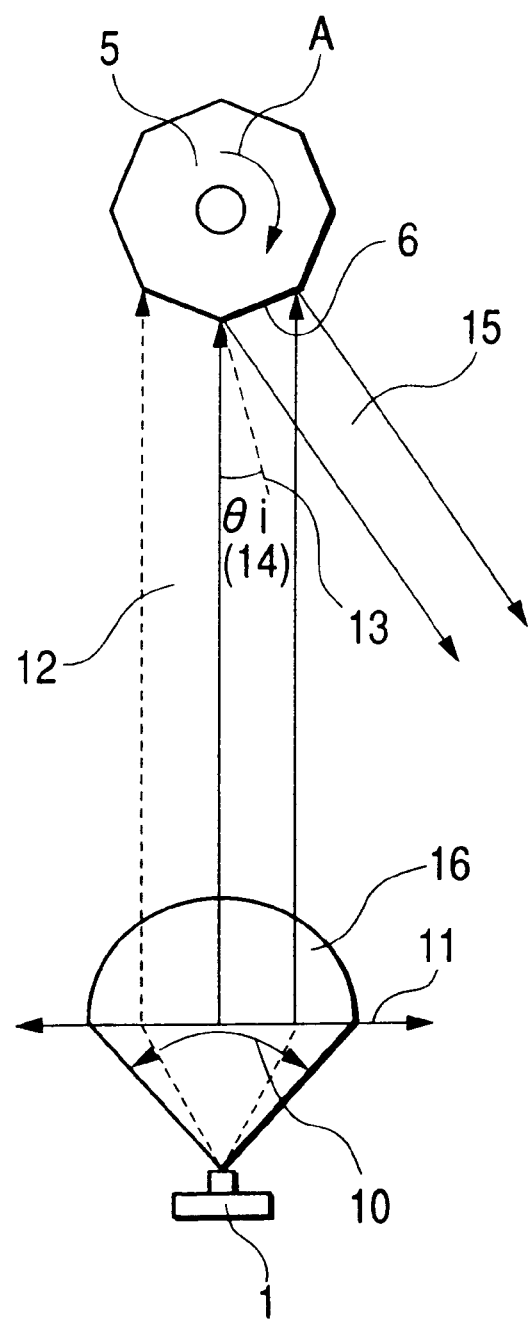
FIG. 8 is a schematic sectional view of the main portion from the semiconductor laser to the polygon mirror along the main scanning direction of Embodiment 2 of the present invention.

FIG. 8 is a schematic sectional view of the main portion from semiconductor laser 1 to polygon mirror 5 along the main scanning direction of this embodiment. In FIG. 8, the same numerals as in FIG. 5 are used for the corresponding elements.

As shown in FIG. 8, owing to a brighter effective F-number for emission angle 10 of the semiconductor laser on the side of semiconductor laser 1 of light-introducing optical system 11, the light quantity of deflected light flux 15 reflected and deflected by facet 6 varies greatly depending on the view angle. This is caused not only by the variation of the breadth of deflected light flux 15, but also by the effect of the larger gradient in Gaussian distribution 16 of the intensity of incident light flux 12.

In the OFS system, as in this embodiment, the reflected and deflected portion 15 of incident light flux 12 is altered depending on the view angle. Further, in light-introducing optical system 11 having an effective F-number set brighter on the side of semiconductor laser 1, the gradient in Gaussian distribution 16 of the intensity of incident light flux 12 becomes greater to decrease the light quantity from the center portion toward the periphery portion. Thus, the variation of the light flux breadth of deflected light flux 15 and the larger variation of the gradient of Gaussian distribution 16 of the intensity of incident light flux 12 causes great variation of the light quantity depending on the view angle to result in nonuniformity in the light quantity on the scanned face disadvantageously.

Semiconductor laser 1 is used to emit S-polarized light with the minimum emission angle of 23° in the main scanning direction. In this case, the light quantity decreases in the periphery portion to be 94.9% of that in the center portion owing to the Gaussian distribution of the intensity of the incident light flux and the variation of the F-number of the deflected light flux.

To correct the decrease of the light quantity in the periphery portion, the reflectivity of flat mirror 18 is increased, thereby uniformizing the light quantity distribution on scanned face 9. Specifically, the respective elements are formed so as to satisfy Formulas (3) to (6):

Formulas (3) to (6):

$$0.95 \times \frac{I0}{I\theta} \times R0 \le R\theta \le 1.05 \times \frac{I0}{I\theta} \times R0 \tag{3}$$

$$I0 = 2 \times \int_0^{\frac{\sin(\frac{\pi}{M})}{\sin\{(1+D)\times(\frac{\pi}{M})\}}} e^{\left\{\ln(0.5)\times\left(\frac{x}{2\times F\times\tan(\frac{\alpha}{2})}\right)^2\right\}} dx \tag{4}$$

$$I\theta = \int_{-\frac{\sin\{(1-D)\times\frac{\pi}{M}\}}{\sin\{(1+D)\times\frac{\pi}{M}\}}}^{1} e^{\left\{\ln(0.5)\times\left(\frac{x}{2\times F\times\tan(\frac{\alpha}{2})}\right)^2\right\}} dx \tag{5}$$

$$D = \frac{L \times M}{4 \times \pi \times C}, \tag{6}$$

where R0 is the reflectivity on the axis of flat mirror 18, Rθ is the reflectivity outside the axis of flat mirror 18, M is the number of deflection faces of the polygon mirror, D is the scanning efficiency, L is the effective scanning range, F is the effective F-number on the light source side of the first optical system, α is the emission angle of the light source represented by half-breadth, C is the fθ coefficient.

Table 2 shows the reflectivity of flat mirror 18 in this embodiment. The flat mirror 18 is formed from two-layer film to decrease the number of the layers to satisfy the film thickness tolerance in mass production.

In the OFS employing the light-introducing system having the effective F-number as bright as F=6 as in this embodiment, the drop of the light quantity in the periphery portion can be corrected for substantially uniform distribution of the light quantity on scanned face 9.

In this embodiment as described above, the reflectivity of flat mirror 18 is varied from the center portion toward the periphery portion, especially so as to satisfy the conditional equations (3) to (6) for the reflectivity on the axis and outside the axis. This corrects the variation of the F-number of the deflected light flux, and drop of the light quantity in the periphery portion in the OFS system for every view angle. Thereby, the light quantity distribution can be substantially uniformized in the OFS system without causing drop of the light quantity on the scanned face.

In this embodiment, the reflectivity of flat mirror 18 is changed which does not participate in the image formation of the optical system. Therefore, the mirror may be arranged irrespective of the image formation relations of the optical system with less limitation in the setting angle and position, and the mirror can readily be prepared because the face to be coated with the dielectric film for deciding the reflectivity characteristics is flat.

[Embodiment 3]

Figure 9:
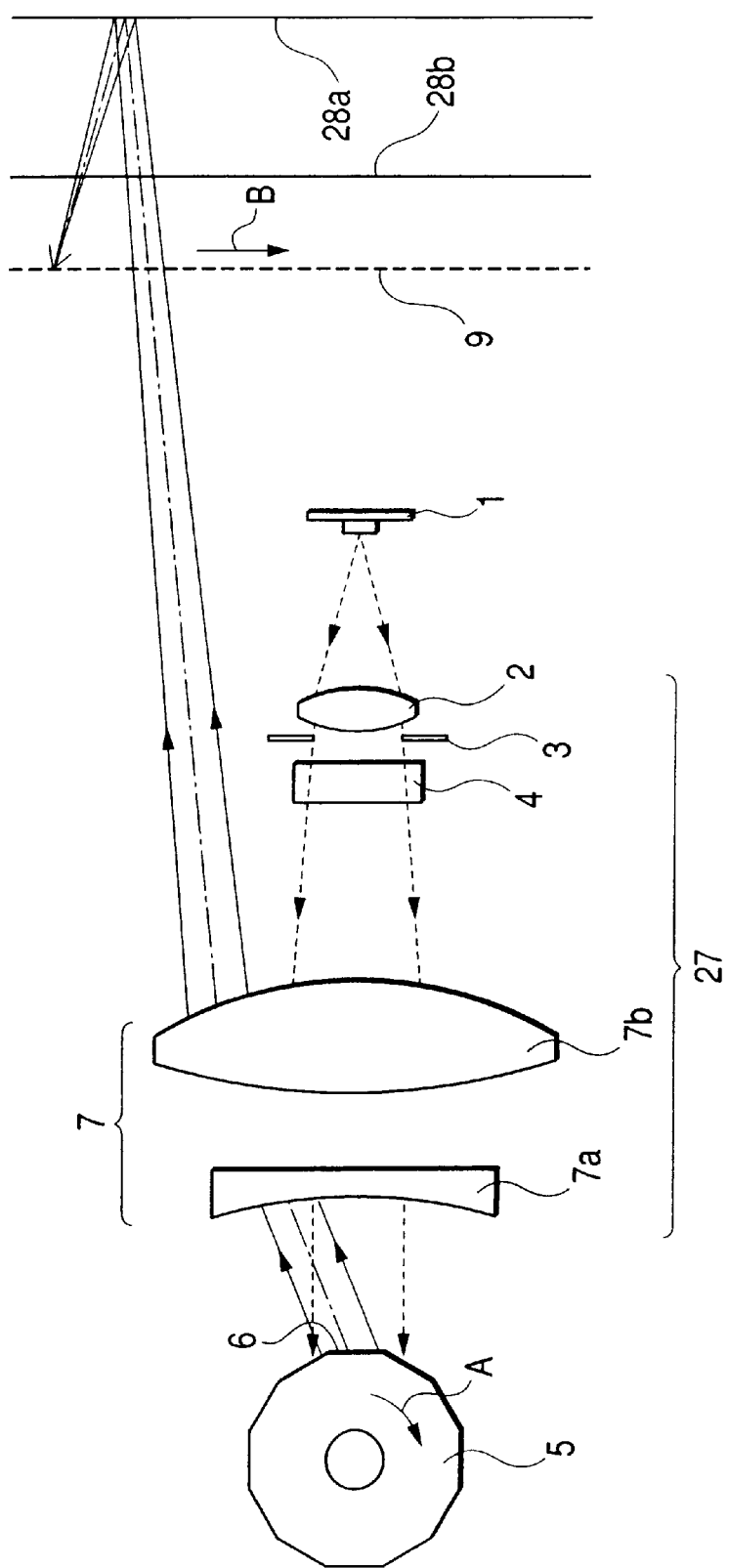
FIG. 9 is a sectional view of the optical scanner of Embodiment 3 of the present invention along the main scanning direction.
Figure 10:
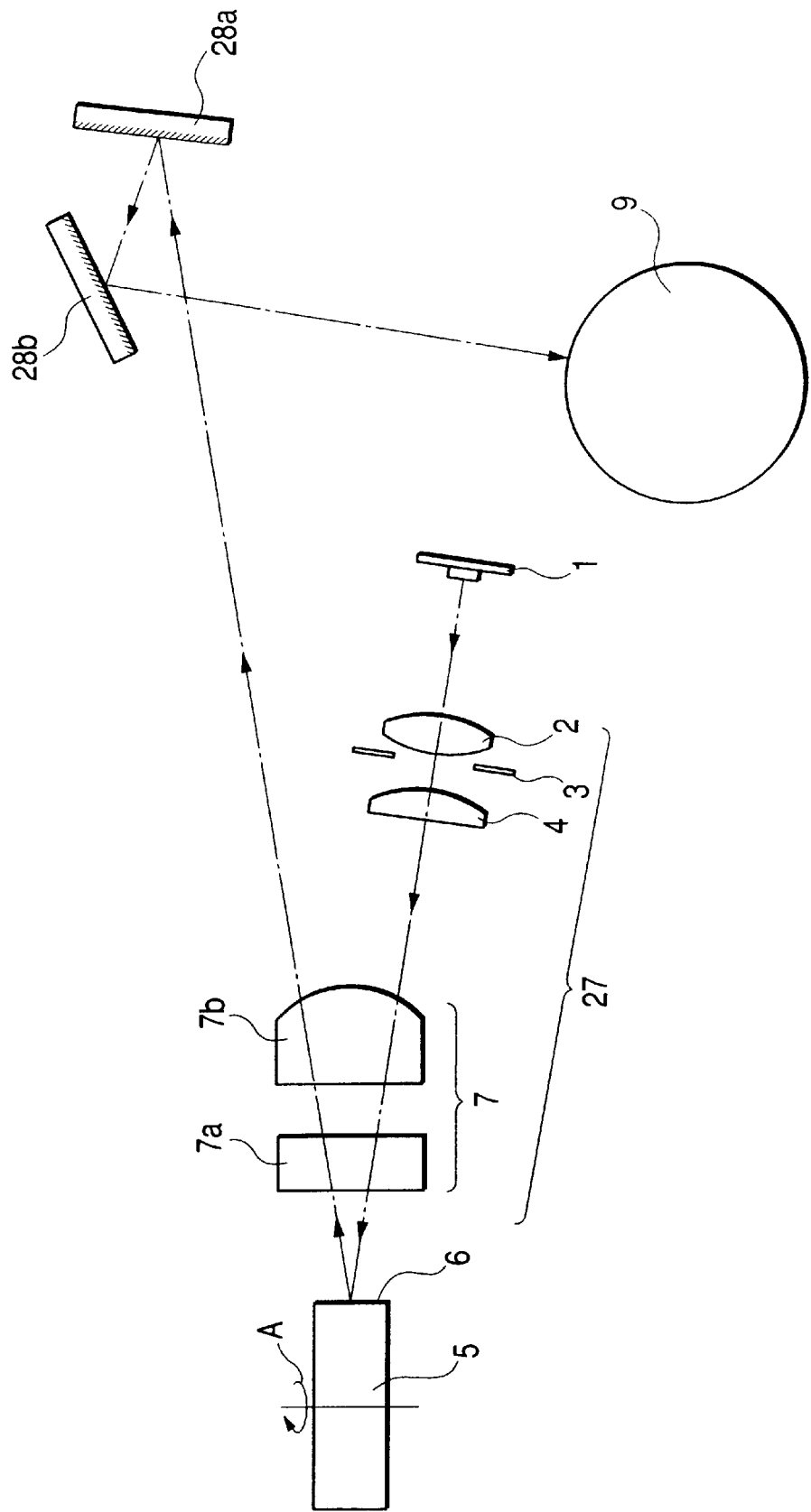
FIG. 10 is a sectional view of the optical scanner of Embodiment 3 of the present invention along the sub-scanning direction.

FIG. 9 is a sectional view of the main portion of the optical scanner of Embodiment 3 of the present invention along the main scanning direction (main scanning sectional view). FIG. 10 is a sectional view of the main portion of the optical scanner of Embodiment 3 of the present invention along the sub-scanning direction (sub-scanning sectional view). In FIGS. 9 and 10, the same numerals as in FIGS. 3 and 4 are used for the corresponding elements.

This embodiment is different from Embodiment 2 in that the effective F-number of the light-introducing optical system is further made brighter to F=4, and correspondingly two flat mirrors are employed as the reflectivity-varying reflection member. Otherwise, the constitution and the optical performance are nearly the same as in Embodiment 2, whereby the same effects are attained.

Specifically, in FIGS. 9 and 10, first and second flat mirrors 28a,28b (return mirrors) as the reflection member have respectively the reflectivity varying from the center portion toward the periphery portion.

Thus, in this embodiment, first and second flat mirrors 28a,28b have respectively the reflectivity increasing continuously with increase of the incident angle of the light flux introduced to the flat mirrors 28a,28b, and the reflectivity for polarized light of a larger deflection component on axis is lower than for the other deflection component of polarized light. Further, the relation between the product of the reflectivities on the axis and the product of reflectivities outside the axis is set to satisfy Formulas (4) to (7) shown later. Incidentally, Formulas (4) to (6) are the same as those shown in Embodiment 2.

In the aforementioned Embodiment 2, the ratio of the reflectivities off axis is raised by about 6% by employing a two-layered film on flat mirror 18, which results in the absolute reflectivity on the axis of as low as 33.5%. In this embodiment, the maximum scanning angle is as small as 27°. In such a case, the light quantity distribution cannot readily be corrected sufficiently with only one mirror by making the effective F-number brighter (F=4). Further, in such a case, the absolute reflectivity drops to make insufficient the absolute light quantity on scanned face 9.

Therefore, in this embodiment, first and second flat mirrors 28a,28b having respectively a varying reflectivity are employed for correction to prevent drop of the light quantity and to uniformize substantially the light quantity distribution.

In this embodiment, the elements are formed to satisfy the conditions shown by Equations (4) to (7) below:

$$0.95 \times \frac{I0}{I\theta} \times R'0 \leq R'\theta \leq 1.05 \times \frac{I0}{I\theta} \times R'0 \quad (7)$$

$$I0 = 2 \times \int_0^1 \frac{\sin(\frac{\pi}{M})}{\sin\{(1+D)\times(\frac{\pi}{M})\}} e^{\left\{\ln(0.5)\times\left(\frac{x}{2\times F\times\tan(\frac{\alpha}{2})}\right)^2\right\}} dx \quad (4)$$

$$I\theta = \int_{\frac{\sin\{(1-D)\times\frac{\pi}{M}\}}{\sin\{(1+D)\times\frac{\pi}{M}\}}}^1 e^{\left\{\ln(0.5)\times\left(\frac{x}{2\times F\times\tan(\frac{\alpha}{2})}\right)^2\right\}} dx \quad (5)$$

$$D = \frac{L \times M}{4 \times \pi \times C}, \quad (6)$$

where R'0 is the product of reflectivities on the axis of first and second flat mirrors 28a,28b, R'θ is the product of reflectivities outside the axis of first and second mirrors 28a,28b, M is the number of deflection faces of the polygon mirror, D is the scanning efficiency, L is the effective scanning range, F is effective F-number on the light source side of the first optical system, α is the emission angle of the light source represented by half-breadth, C is the fθ coefficient.

Table 3 shows the reflectivities of first and second flat mirrors 28a,28b.

In this embodiment, the ratio of the reflectivity on the axis to that outside the axis of second flat mirror 28b is made higher than that ratio of first flat mirror 28a. In particular in this embodiment, the reflectivity outside the axis is increased by utilizing the dependence of the reflectivity on the light polarization direction. For this purpose, the reflectivity difference between P-polarized light and S-polarized light is made larger in second flat mirror 28b than in first flat mirror 28a. In this embodiment, the light polarization direction introduced to first and second flat mirrors 28a,28b is P-polarization direction, and the first and second flat mirrors 28a,28b are both designed to have a higher reflectivity for S-polarization light than for P-polarization light. Thereby, the optical scanner is provided which gives substantially uniform light quantity distribution on scanned face 9 with a simple constitution, even when the effective F-number is made brighter on the side of semiconductor laser 1 of light-introducing system 11 to utilization efficiency of output of semiconductor laser 1.

In this embodiment, the correction is made for the ratio of the light quantity of the polarized light on the axis to that at the outermost portion from the axis, but is not limited thereto. For example, the same effect is achievable by correcting the light quantity ratio at least one view angle between the axis and the outermost portion where the light quantity variation is large.

As described above, the reflectivities of the two flat mirrors 28a,28b are varied from the center portion toward the periphery portion. More preferably, the product of reflectivities on the axis of first and second flat mirrors 28a,28b, and the product of reflectivities outside the axis of first and second mirrors 28a,28b are adjusted to satisfy Equations (4) to (7). Thus, in an OFS system, the drop of the light quantity is corrected which is caused by the variation of the F-number of the deflected light flux and the gradient of Gaussian distribution of the intensity of incident light flux. Thereby the light distribution on the scanned face is made substantially uniform. Further, according to this embodiment, since the correction effect can be made higher, the light flux emitted from light source 1 can be utilized more effectively thereby to increase the light quantity on scanned face 9. Furthermore, the output of the light source 1 can be decreased, which is advantageous in operation cost. In this embodiment, the difference of the reflectivities in polarization direction is maximized at the position where the polarization component other than the one on the axis becomes the maximum on second flat mirror 28b nearest to scanned face 9, whereby the light intensity correction can be conducted most effectively by utilizing the difference of the reflectivities in the light polarization direction.

[Embodiment 4]

Figure 11:
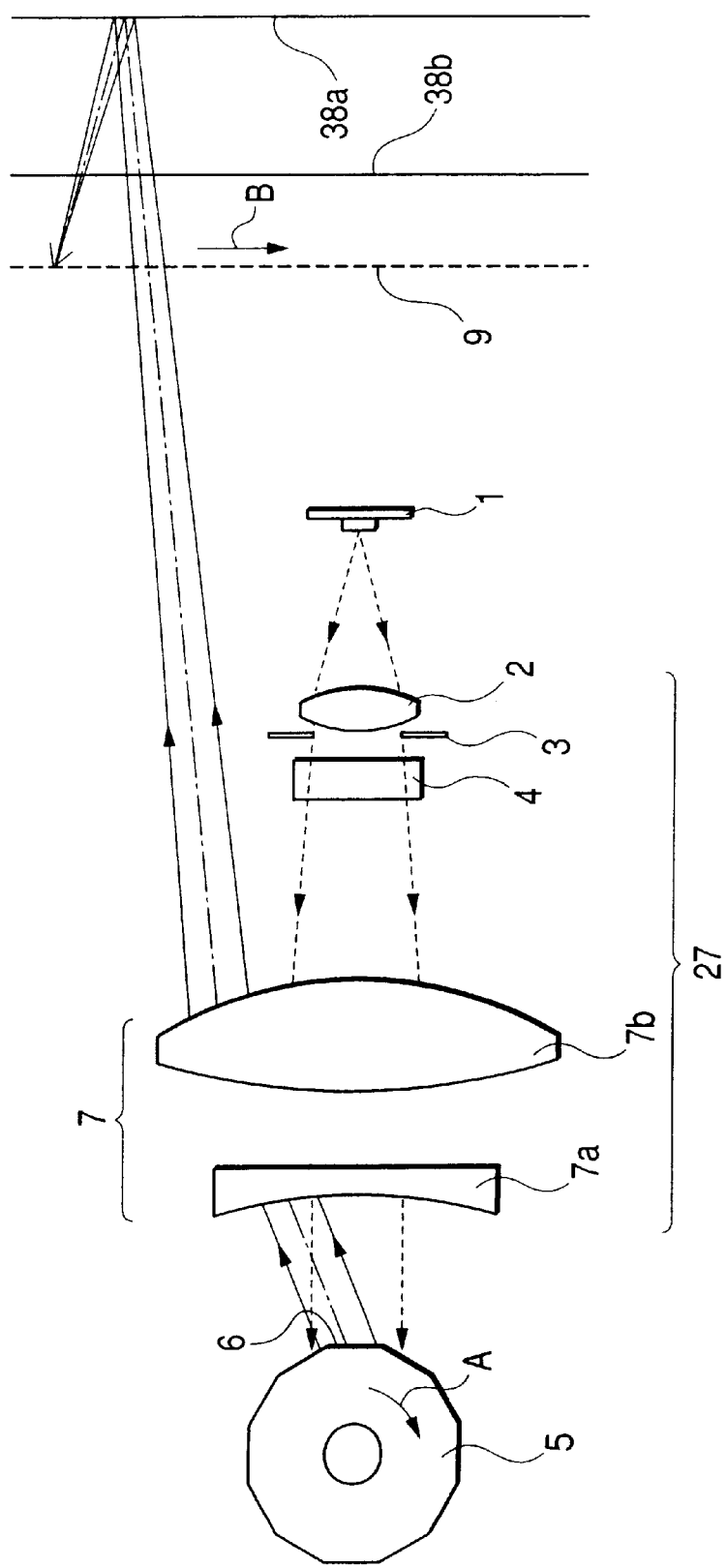
FIG. 11 is a sectional view of the optical scanner of Embodiment 4 of the present invention along the main scanning direction.
Figure 12:
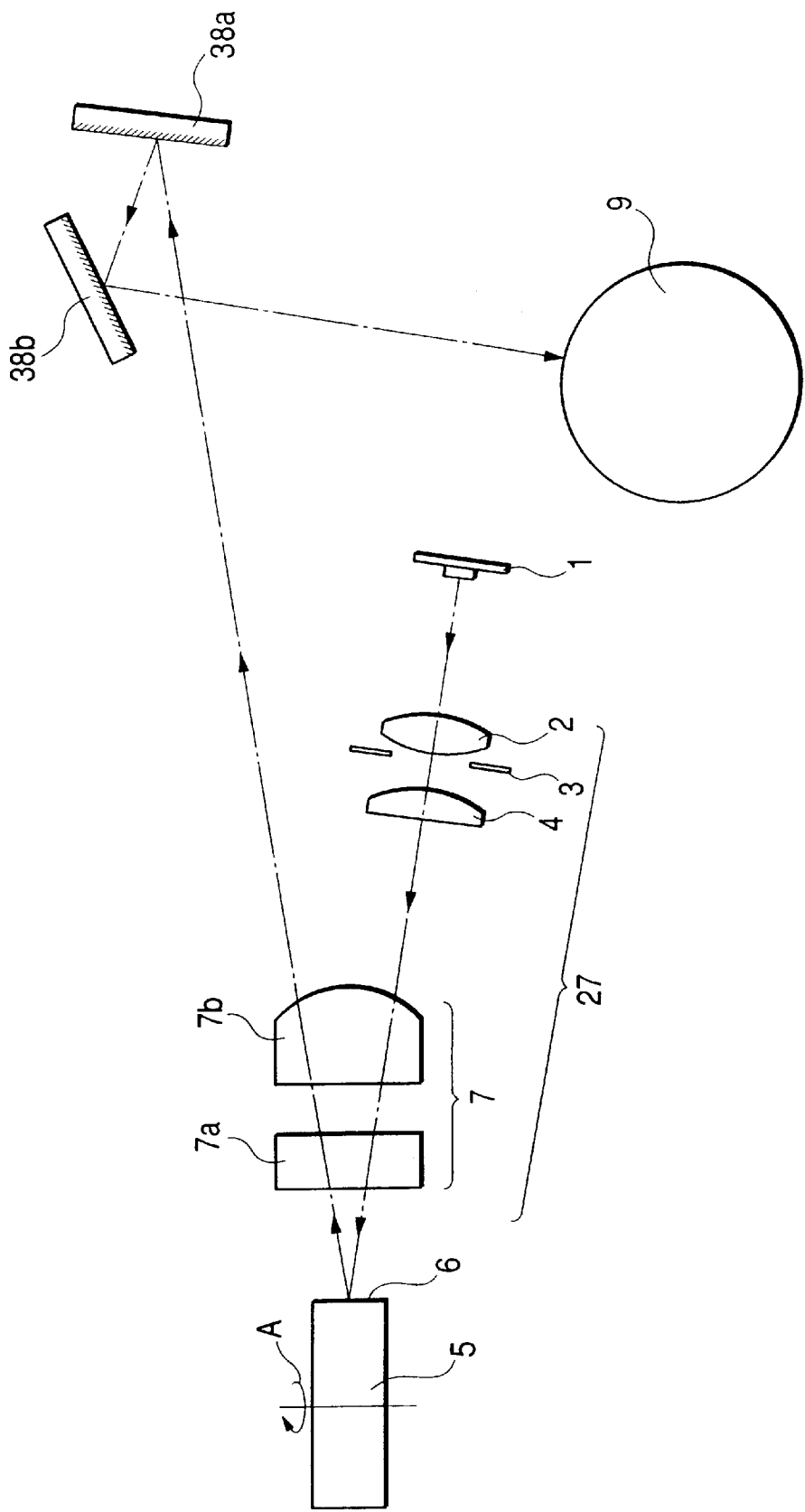
FIG. 12 is a sectional view of the optical scanner of Embodiment 4 of the present invention along the sub-scanning direction.

FIG. 11 is a sectional view of the main portion of the optical scanner of Embodiment 4 of the present invention along the main scanning direction (main scanning sectional view). FIG. 12 is a sectional view of the main portion of the optical scanner of Embodiment 4 of the present invention along the sub-scanning direction (sub-scanning sectional view). In FIGS. 11 and 12, the same numerals as in FIGS. 9 and 10 are used for the corresponding elements.

This embodiment is different from Embodiment 3 in that the first and second flat mirrors as the reflection member are comprised of flat mirrors having the same film structure. Otherwise, the constitution and the optical performance are nearly the same as in Embodiment 3, whereby the same effects are attained.

Specifically, in FIGS. 11 and 12, first and second flat mirrors 38a,38b (return mirrors) as the reflection member have respectively the reflectivity varying from the center portion toward the periphery portion.

Thus, in this embodiment, first and second flat mirrors 38a,38b have respectively the reflectivity increasing continuously with increase of the incident angle of the light flux introduced to the flat mirrors 38a,38b, and the reflectivity for polarized light of a larger deflection component being lower than for the other deflection component of polarized light. Further, the relation between the product of the reflectivities on the axis and the product of reflectivities outside the axis is set to satisfy Equations (4) to (7) shown before.

Table 4 shows the reflectivities of first and second flat mirrors 38a,38b.

In this embodiment, first and second flat mirrors 38a,38b have characteristics of varying the reflectivity as a function of the incident angle, and as a function of the light polarization direction.

First and second flat mirrors 38a,38b do not participate in image focusing, so that the incident angles of the light flux introduced thereto can be set for the reflectivity without restriction. The light flux reflected by first flat mirror 38a is introduced to second flat mirror 38b with the polarization direction of the light flux turned by the reflection. Therefore, the drop of the light quantity at the periphery portion can be corrected more effectively by increasing the dependency of reflectivity on light polarization. Since the incident light and the polarization direction of the light flux varies continuously with the view angle, the reflectivities of first and second flat mirrors 38a,38b can be varied continuously. In this embodiment, the incident angles introduced to first and second flat mirrors 38a,38b is set so as to obtain the prescribed reflectivity according to the aforementioned two reflection characteristics.

As described above, according to this embodiment, the light quantity distribution on the scanned face can be controlled to be practically acceptable level even with two flat mirrors of the same film constitution as the reflection member. Such mirrors can be produced by one and the same equipment for film formation, vapor deposition under the same conditions for design, production, and storage, which is of great advantage in cost.

The optical scanner of the present invention described above are useful for electrophotographic printers such as laser beam printers (LBP) and digital copying machines. This is explained by reference to FIG. 13.

Figure 13:
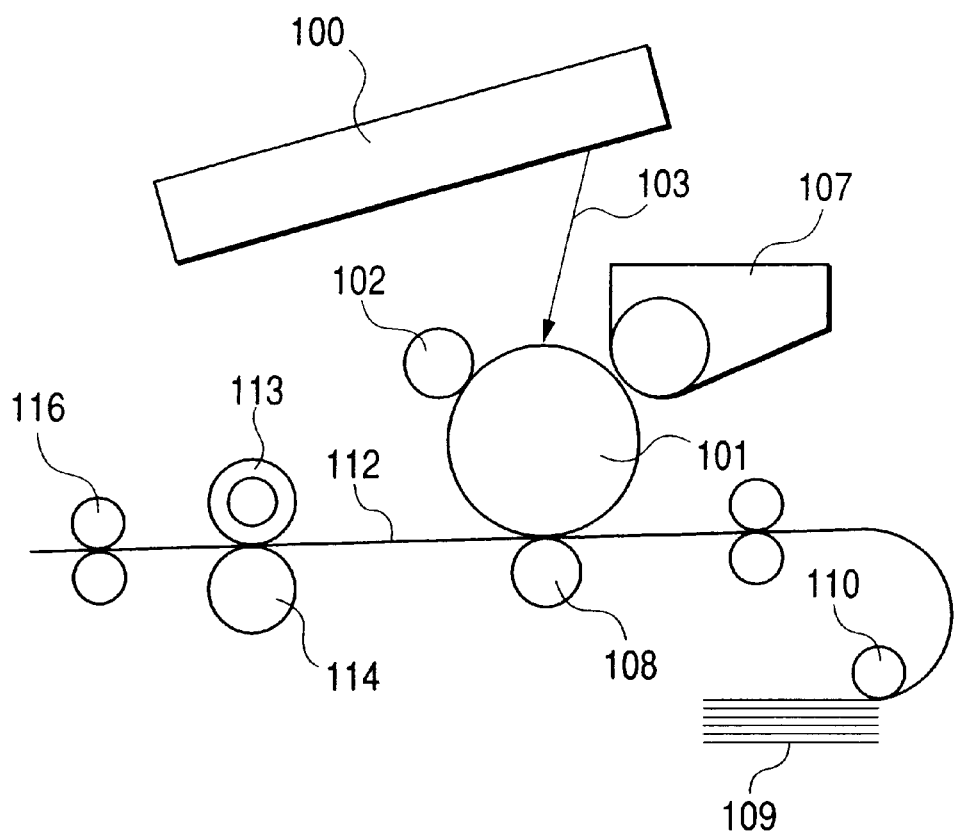
FIG. 13 is a sectional view illustrating constitution of a main portion of an electrophotographic printer employing an optical scanner of the present invention, along the sub-scanning direction.

FIG. 13 is a schematic sectional view of constitution of a main portion of an electrophotographic printer employing an optical scanner of the present invention along the sub-scanning direction. In FIG. 13, the numeral 100 indicates an optical scanner described in any of Embodiments 1–4, and the numeral 101 indicates a photosensitive drum for holding an electrostatic latent image. Electrifying roller 102 is brought into contact with photosensitive drum 101 for electrifying uniformly photosensitive drum 101. Light beam 103 is projected and allowed to scan the electrified surface by optical scanner 100 on the downstream side of the rotation direction of photosensitive drum.

Light beam 103 is modified in accordance with image data. The latent image is formed by projection of light beam 103 on the aforementioned photosensitive drum 101. This electrostatic latent image is developed as a toner image by development device 107 provided in contact with photosensitive drum 101 on the downstream side of the projection site of light beam 103 in rotation direction of photosensitive drum 101. The toner image is transferred onto transfer-receiving paper sheet 112 by transfer roller 108 placed in opposition to and under photosensitive drum 101. Paper sheet 112 is stored in the paper cassette 109 before photosensitive drum 109 (on the right side in FIG. 13). The paper sheet may be inserted by hand. On the end portion of the cassette 109, there are provided paper-feeding roller 110 which feed paper sheet to the paper delivery path.

Paper sheet 112 onto which the unfixed toner image has been transferred is delivered further to a fixation device behind photosensitive drum (on the left side in FIG. 13). The fixation device is comprised of fixing roller 113 having a fixing heater (not shown in the drawing) inside, and pressing roller 114 in contact with fixing roller 113. The paper sheet delivered from the transfer section is pressed and heated at the fixation section by fixing roller 113 and pressing roller 114 to fix the toner image on paper sheet 112. Paper sheet 112 is discharged out of the printer by paper discharge roller 116 provided behind fixation roller 113.

The present invention can be modified in a various manner in addition to the aforementioned Embodiments. The present invention covers all of the modifications included in the claims.

TABLE 1

Variation of Reflectivity of Cylindrical Mirror in Embodiment 1

| Scanning position (mm) | View angle (degrees) | Incident angle of light flux introduction (degrees) | Breadth of deflected light flux (mm) | Reflectivity of mirror (%) | Relative light quantity of deflected light flux |
|---|---|---|---|---|---|
| 155.0 | 27.0 | 13.50 | 10.07 | 74.6 | 1.000 |
| 77.5 | 13.5 | 6.75 | 10.28 | 73.5 | 1.007 |
| 0.0 | 0.0 | 0.00 | 10.35 | 72.5 | 1.000 |
| −77.5 | −13.5 | −6.75 | 10.28 | 73.5 | 1.007 |
| −155.0 | −27.0 | −13.50 | 10.07 | 74.6 | 1.000 |

TABLE 2

Reflectivity of Flat Mirror in Embodiment 2

| Scanning position (mm) | View angle (degrees) | Relative light quantity of light flux introduced to facet | Reflectivity of mirror (%) | Relative light quantity of deflected light flux |
|---|---|---|---|---|
| 155.0 | 27.0 | 0.949 | 35.5 | 1.007 |
| 0.0 | 0.0 | 1.000 | 33.5 | 1.000 |
| −155.0 | −27.0 | 0.949 | 35.5 | 1.007 |

TABLE 3

Reflectivities of First and Second Flat Mirrors in Embodiment 3

| Scanning position (mm) | View angle (degrees) | Relative light quantity of light flux introduced to facet | Reflectivity of first mirror (%) | Reflectivity of second mirror (%) | Relative light quantity of deflected light flux |
|---|---|---|---|---|---|
| 155.0 | 27.0 | 0.921 | 74.5 | 72.3 | 0.991 |
| 0.0 | 0.0 | 1.000 | 72.5 | 69.1 | 1.000 |
| −155.0 | −27.0 | 0.921 | 74.5 | 72.3 | 0.991 |

TABLE 4

Reflectivities of First and Second Flat Mirrors in Embodiment 4

| Scanning position (mm) | View angle (degrees) | Relative light quantity of light flux introduced to facet | Reflectivity of first mirror (%) | Reflectivity of second mirror (%) | Relative light quantity of deflected light flux |
|---|---|---|---|---|---|
| 155.0 | 27.0 | 0.921 | 73.8 | 73.9 | 0.989 |
| 0.0 | 0.0 | 1.000 | 71.2 | 71.3 | 1.000 |
| −155.0 | −27.0 | 0.921 | 73.8 | 73.9 | 0.989 |

What is claimed is:

1. An optical scanner comprising:

a light source;

a polygon mirror having plural light deflection faces for deflecting a light flux emitted from the light source;

a first optical system for introducing the light flux emitted from the light source to the polygon mirror in which the light flux introduced to the polygon mirror has a breadth in a main scanning direction larger than a breadth of one of the light deflection faces in the main scanning direction; and a second optical system for condensing the light flux deflected by the polygon mirror onto a scanned face, wherein the second optical system has a reflection member for reflecting and introducing the light flux onto the scanned face, and the reflection member has a reflectivity varying from a center toward a periphery in the main scanning direction to uniformize substantially a light quantity distribution in the main scanning direction of the light flux on the scanned face.

2. The optical scanner according to claim 1, wherein the light quantity distribution in the main scanning direction of the light flux on the scanned face is characterized in that a light quantity varies within ±5% of the light quantity on the axis taken as 100% at any point of an effective scanning range.

3. The optical scanner according to claim 1, wherein the second optical system employs a part of the first optical system in common for constitution thereof.

4. The optical scanner according to claim 1, wherein the reflection member has the reflectivity increasing continuously with increase of an incident angle of the light flux introduced to the reflection member.

5. The optical scanner according to claim 1, wherein the reflection member is characterized in that a reflectivity to a polarized light component having a larger light quantity on the axis is lower than that to the other polarized light component perpendicular thereto.

6. The optical scanner according to claim 1, wherein the reflection member comprises a cylindrical mirror.

7. The optical scanner according to claim 1, wherein the reflection member comprises a flat mirror.

8. The optical scanner according to claim 1, wherein the conditional formulas below are satisfied:

$$0.95 \times \frac{I0}{I\theta} \times R0 \leq R\theta \leq 1.05 \times \frac{I0}{I\theta} \times R0,$$

$$I0 = 2 \times \int_0^{\frac{\sin(\frac{\pi}{M})}{\sin\{(1+D)\times(\frac{\pi}{M})\}}} e^{\left\{\ln(0.5)\times\left(\frac{x}{2\times F\times\tan(\frac{\alpha}{2})}\right)^2\right\}} dx,$$

$$I\theta = \int_{-\frac{\sin\{(1-D)\times\frac{\pi}{M}\}}{\sin\{(1+D)\times\frac{\pi}{M}\}}}^{1} e^{\left\{\ln(0.5)\times\left(\frac{x}{2\times F\times\tan(\frac{\alpha}{2})}\right)^2\right\}} dx,$$

$$D = \frac{L \times M}{4 \times \pi \times C},$$

wherein R0 is the reflectivity on the axis of the reflection member, Rθ is the reflectivity outside the axis of the reflection member, M is the number of deflection face of the polygon mirror, D is the scanning efficiency, L is the effective scanning range, F is effective F-number on the light source side of the first optical system, α is the emission angle of the light source represented by half-breadth, C is the fθ coefficient.

9. An optical scanner comprising:

a light source;

a polygon mirror having plural light deflection faces for deflecting a light flux emitted from the light source;

a first optical system for introducing the light flux emitted from the light source to the polygon mirror in which the light flux introduced to the polygon mirror has a breadth in a main scanning direction larger than a breadth of one of the light deflection faces in the main scanning direction; and a second optical system for condensing the light flux deflected by the polygon mirror onto a scanned face, wherein the second optical system has at least two reflection members for reflecting and introducing the light flux onto the scanned face, and each of the reflection members has a reflectivity varying from a center toward a periphery in the main scanning direction to uniformize substantially a light quantity distribution in the main scanning direction of the light flux on the scanned face.

10. The optical scanner according to claim 9, wherein the light quantity distribution in the main scanning direction of the light flux on the scanned face is characterized in that a light quantity varies within ±5% of the light quantity on the axis taken as 100% at any point of an effective scanning range.

11. The optical scanner according to claim 9, wherein the second optical system employs a part of the first optical system in common for constitution thereof.

12. The optical scanner according to claim 9, wherein the reflection member has the reflectivity increasing continuously with increase of an incident angle of the light flux introduced to the reflection member.

13. The optical scanner according to claim 9, wherein the reflection member is characterized in that a reflectivity to a polarized light component having a larger light quantity on the axis is lower than that to the other polarized light component perpendicular thereto.

14. The optical scanner according to claim 9, wherein films of the same constitution are formed on surfaces of the respective at least two reflection members.

15. The optical scanner according to claim 9, wherein, of the at least two reflection members, the reflection member placed nearest to the scanned face has different reflectivities for P-polarized light and for S-polarized light, the difference of the reflectivities being larger than the difference of any other reflection members.

16. The optical scanner according to claim 9, wherein the reflection member comprises a flat mirror.

17. The optical scanner according to claim 9, wherein the conditional formulas below are satisfied:

$$0.95 \times \frac{I0}{I\theta} \times R'0 \leq R'\theta \leq 1.05 \times \frac{I0}{I\theta} \times R'0,$$

$$I0 = 2 \times \int_0^{\frac{\sin(\frac{\pi}{M})}{\sin\{(1+D)\times(\frac{\pi}{M})\}}} e^{\left\{\ln(0.5)\times\left(\frac{x}{2\times F\times\tan(\frac{\alpha}{2})}\right)\right\}^2} dx,$$

$$I\theta = \int_{-\frac{\sin\{(1-D)\times\frac{\pi}{M}\}}{\sin\{(1+D)\times\frac{\pi}{M}\}}}^{1} e^{\left\{\ln(0.5)\times\left(\frac{x}{2\times F\times\tan(\frac{\alpha}{2})}\right)\right\}^2} dx,$$

$$D = \frac{L \times M}{4 \times \pi \times C},$$

where R'0 is the product of reflectivities on the axes of the at least two reflection members, R'θ is the product of reflectivities outside the axes of the at least two reflection members, M is the number of deflection face of the polygon mirror, D is the scanning efficiency, L is the effective scanning range, F is effective F-number on the light source side of the first optical system, α is the emission angle of the light source represented by half-breadth, C is the fθ coefficient.

18. An electrophotographic printer comprising:
the optical scanner set forth in any of claims 1 to 17;
a photosensitive member placed on the scanned face to be scanned by the optical scanner;
a development device for developing an electrostatic latent image formed by scanning of the photosensitive member with a light flux into a toner image;
a transfer device for transferring the developed toner image onto a paper sheet, and
a fixing device for fixing the transferred toner image on the paper sheet.

* * * * *

UNITED STATES PATENT AND TRADEMARK OFFICE
CERTIFICATE OF CORRECTION

PATENT NO.    : 6,185,029 B1                                     Page 1 of 1
DATED         : February 6, 2001
INVENTOR(S)   : Keiichiro Ishihara It is certified that error appears in the above-identified patent and that said Letters Patent is hereby corrected as shown below:

Column 1,
Line 24, "fe" should read -- f$\theta$ --.

Signed and Sealed this

Second Day of November, 2004

JON W. DUDAS
*Director of the United States Patent and Trademark Office*